(12) United States Patent
Reilly et al.

(10) Patent No.: US 12,712,734 B2
(45) Date of Patent: Aug. 18, 2026

(54) ONE-TIME PASSWORD DELIVERY VIA IN-BAND UNAUTHENTICATED CHANNEL

(71) Applicant: Entrust Corporation, Shakopee, MN (US)

(72) Inventors: Ian Reilly, Ottawa (CA); Emilio Belmonte, Seville (ES)

(73) Assignee: Entrust Corporation, Shakopee, MN (US)

( * ) Notice: Subject to any disclaimer, the term of this patent is extended or adjusted under 35 U.S.C. 154(b) by 88 days.

(21) Appl. No.: 18/240,845

(22) Filed: Aug. 31, 2023

(65) Prior Publication Data

US 2024/0097909 A1 Mar. 21, 2024

Related U.S. Application Data

(60) Provisional application No. 63/374,183, filed on Aug. 31, 2022.

(51) Int. Cl.
*H04L 9/32* (2006.01)
*H04L 9/30* (2006.01)

(52) U.S. Cl.
CPC .......... *H04L 9/3228* (2013.01); *H04L 9/3073* (2013.01); *H04L 9/3271* (2013.01)

(58) Field of Classification Search
CPC ... H04L 9/3228; H04L 9/3073; H04L 9/3271; H04L 63/0815; H04L 63/0838; H04L 9/0863; H04L 63/0846; H04L 63/067; H04W 12/068
See application file for complete search history.

(56) References Cited

U.S. PATENT DOCUMENTS

| | | | | |
|---|---|---|---|---|
| 10,536,436 | B1 * | 1/2020 | Barbour | H04L 63/0838 |
| 10,778,435 | B1 * | 9/2020 | Wimberley | H04L 9/3231 |
| 2003/0156721 | A1 | 8/2003 | Widman | |
| 2012/0204245 | A1 | 8/2012 | Ting et al. | |
| 2013/0139222 | A1 * | 5/2013 | Kirillin | H04L 67/02 726/4 |
| 2014/0215589 | A1 | 7/2014 | Deitrich et al. | |
| 2015/0199528 | A1 * | 7/2015 | Bobinski | G06F 8/61 713/191 |
| 2017/0099137 | A1 * | 4/2017 | Pang | H04L 9/0825 |
| 2017/0364875 | A1 * | 12/2017 | Efroni | G06F 21/31 |
| 2018/0083955 | A1 * | 3/2018 | Tuli | H04L 63/0861 |
| 2019/0013945 | A1 | 1/2019 | Hamlin et al. | |

(Continued)

FOREIGN PATENT DOCUMENTS

| | | | |
|---|---|---|---|
| EP | 3557815 | A1 | 10/2019 |
| WO | 2019110574 | A1 | 6/2019 |

OTHER PUBLICATIONS

International Search Report and Written Opinion for PCT/IB2023/058637, mailed Nov. 28, 2023.

*Primary Examiner* — Techane Gergiso
(74) *Attorney, Agent, or Firm* — Merchant & Gould P.C.

(57) ABSTRACT

A method of delivering a one-time password to an entity is provided. The entity requesting the one-time password provides a public key of a public-private key pair to the authentication service. The entity can then submit a challenge request to the authentication service. The authentication service will generate a one-time password, and encrypt the one-time password with the public key. The encrypted one-time password is delivered to the entity via an unauthenticated channel.

17 Claims, 5 Drawing Sheets

(56) References Cited

U.S. PATENT DOCUMENTS

2019/0295074 A1* 9/2019 Carrott ................ H04L 63/0838
2020/0382305 A1* 12/2020 Wimberley ............... H04L 9/14
2021/0176141 A1 6/2021 Diaz-Cuellar et al.
2023/0020656 A1* 1/2023 Momchilov ........ H04L 63/0807
2023/0198767 A1* 6/2023 Nagandla ............. H04L 9/3239
713/159

* cited by examiner

ONE-TIME PASSWORD DELIVERY VIA IN-BAND UNAUTHENTICATED CHANNEL

CROSS-REFERENCE TO RELATED APPLICATIONS

The present application claims priority from U.S. Provisional Patent Application No. 63/374,183, filed on Aug. 31, 2022, the disclosure of which is hereby incorporated by reference in its entirety.

BACKGROUND

One-time passwords are often used in the context of secure applications. For example, a one-time password, such as a randomly generated passcode, may be delivered to a and user as a second factor authentication mechanism via an out of band channel (e.g., via text or email). The user may then provide the one-time password as a second factor authentication for access to a secured application, such as corporate enterprise resources, as well as banking, medical, or other analogous applications.

In some instances, the owner of a secure application may wish to utilize a third-party authentication service for generation of one-time passwords. For example, a corporation may wish to utilize a third-party "identity as a service" system that can provide one-time passwords and secure authentication as needed. A typical implementation would involve the application owner receiving a request from an end user for access, and passing end user contact information to the authentication service. The authentication service could then provide the one-time password directly to the end user. The end user could then provide the one-time password back to the authentication service, which would validate the end user identity to the application owner.

In this context, there are circumstances in which application owners wish to deliver the one-time password to their end users directly, without providing customer contact information to the third-party service. In such instances, an authentication service may provide a secure, authenticated channel to the application owner, and the application owner can obtain a one-time password generated by the authentication service via an application programming interface (API) via that authenticated channel. While this achieves the goals of the application owner on an individualized basis, there is additional performance overhead introduced by requiring an authenticated channel between the application owner and the authentication service.

SUMMARY

In general, a method of delivering a one-time password to an entity is provided. In example aspects, an entity requesting the one-time password will register with an authentication service by providing a public key of a public-private key pair to the authentication service. The entity can then submit a challenge request to the authentication service. The authentication service will generate a one-time password, and encrypt the one-time password with the public key. The encrypted one-time password could then be delivered to the entity via an unauthenticated channel. The entity could then decrypt the one-time password using a private key of the public-private key pair. The entity could then use the one-time password as needed e.g., by delivery to a user associated with the entity to provide authentication of the user.

In particular, in a first aspect, a method includes receiving, at an authentication service, a public key of a public-private key pair from an entity, and receiving, at the authentication service, a challenge request from the entity via an unauthenticated communication channel. The method includes generating, at the authentication service, a one-time password, and encrypting, at the authentication service, the one-time password using the public key. The method further includes delivering the encrypted one-time password from the authentication service to the entity via the unauthenticated communication channel.

In a second aspect, a method includes transmitting, from an entity, a public key of a public-private key pair to an authentication service. The method also includes receiving, from an end user, a request for access to a secure resource requiring identity verification, and transmitting, from the entity, a challenge request to the authentication service via an unauthenticated communication channel. The method further includes receiving, at the entity, a one-time password encrypted with the public key from the authentication service via the unauthenticated communication channel, and decrypting, at the entity, the one-time password. The method includes delivering the one-time password to an end-user.

In a third aspect, a system includes an authentication system comprising a processor and a memory storing computer-executable instructions. The instructions, when executed by the processor, cause the authentication system to: receive a public key of a public-private key pair from an entity; receive a challenge request from the entity via an unauthenticated communication channel; generate a one-time password; encrypt the one-time password using the public key; and deliver the encrypted one-time password to the entity via the unauthenticated communication channel.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

As briefly described above, embodiments of the present invention are directed to methods and systems for securely delivering a one-time password to an entity is provided. In example aspects, an entity requesting the one-time password will register with an authentication service by providing a public key of a public-private key pair to the authentication service. The entity can then submit a challenge request to the authentication service. The authentication service will generate a one-time password for use by the entity, and encrypt the one-time password with the public key. The encrypted one-time password could then be delivered to the entity via an unauthenticated channel. The entity could then decrypt the one-time password using a private key of the public-private key pair. The entity could then use the one-time password as needed e.g., by delivery to a user associated with the entity to provide authentication of the user.

In example aspects, the unauthenticated channel is established over a public network. The authentication service may be implemented as part of an identity as a service system offered by a third party provider to the entity. The entity may be, for example, an entity that hosts a secure application that may require one-time passwords for authentication, such as a bank or other financial institution.

In accordance with aspects of the present disclosure, a number of advantages of such an approach are provided. For example, the entity requesting one-time password based authentication of users can control the manner of delivery of one-time passwords to its customers. Furthermore, because the one-time password should be secured, aspects of this disclosure reduce the overhead that would otherwise be required to establish a secure channel between the requesting entity and an authentication service, which is particularly advantageous in situations where there are a high volume of requests for one-time passwords.

Figure 1:
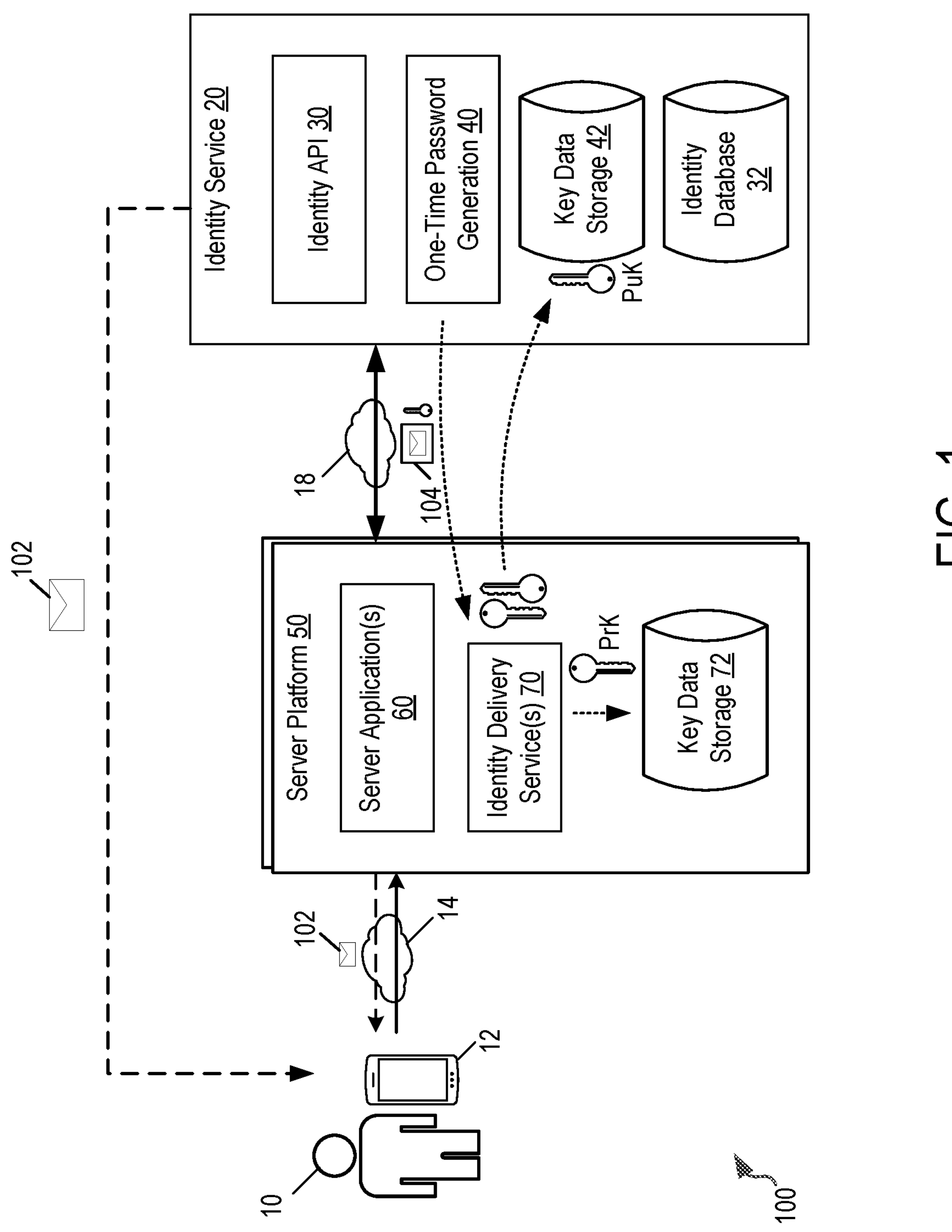
FIG. 1 illustrates an example block diagram of a system within which the secure delivery of a one-time password over an unsecured channel may be implemented, in accordance with example embodiments.

Referring to FIG. 1, an example block diagram of a system 100 is provided, in which the secure delivery of a one-time password over an unsecured channel may be implemented. In the example shown, a computing device, such as user device 12 of a user 10, can communicate with an entity or entities hosting one or more server platforms 50, which may utilize identity service 20. The computing device can communicate with the server platforms 50 via a network 14, which may represent a wide area network such as a corporate network, or a publicly-accessible network such as the internet. The server platform(s) 50 may communicate with the identity service 20 over a network 18, which is generally a public network such as the internet. In some instances, network 14 and network 18 may be the same network.

In the example shown, a user 10 may wish to access one or more secure resources at a server platform 50, controlled by an entity. The server platform 50 may include one or more server devices controlled by the entity. In the example shown, the secure resources can include one or more server applications 60. However, data resources or other types of resources might be accessed as well. In this context, the entity controlling the server platform 50 may require identity authentication of the user 10. For example, an entity may require its own authentication of a user, but may, for secure server applications 60 or other access to secure resources, require further authentication (e.g., multifactor authentication, or MFA), for example through use of a one-time password service. In such instances, the entity may utilize identity authentication services provided by an identity service 20.

The identity service 20 may be implemented on one or more computing systems, including cloud systems, and may be implemented by an entity separate from the server platforms 50. In examples, the identity service 20 cam be included in an "identity as a service" platform, which may provide, for example, multifactor authentication, single sign-on, and identity management services. An example of such an identity service 20 can be the "Identity as a Service" offering from Entrust Corp. of Shakopee, Minnesota.

In the example shown, the identity service 20 provides user authentication services on behalf of one or more entities. In the example shown, the identity service 20 includes an identity API 30. The identity API 30 is accessible by server platforms 50 of various entities. Generally speaking, the identity API 30 may be accessed via encrypted communications over network 18. However, typical communications do not require an authenticated communication channel between the identity service 20 and server platforms 50, since typically the communication between server platforms 50 and the identity service 20 is limited to specific requests and a response with status of identity authentication requests.

In general examples, an entity may transmit (e.g., from a server platform 50) a request to the identity service 20. In some examples of the system 100, the identity service 20 may include a one-time password generation component 40 that generates one-time passwords in response to user authentication requests, e.g., requests to perform multifactor authentication for a particular user. In response, the one-time password generation component 40 can generate such a one-time password. The identity service 20 may therefore respond to requests at the identity API 30 by providing the one-time password 102 usable for authentication of the user 10 to the entity (e.g., via authentication via the identity service 20).

In the example shown, the one-time password 102 may be delivered via an independent communication channel from the identity service 20 to the user device 12 (e.g., via SMS text or via email). In other examples, the one-time password 102 may be delivered to the user by the entity. In these instances, the one-time password 102 may be returned to the server platform 50 via network 18, and the entity can then pass the one-time password 102 to the user device 12 via any desired mechanism to allow for authentication of the user. In such instances, the server platform 50 may include one or more identity delivery services 70, which manage delivery of, e.g., one-time passwords from the server platform to a user device (e.g., user device 12).

In the example shown, the identity service 20 further includes an identity database 32. The identity database 32 stores user identity information that may be usable for user authentication processes, such as the multifactor authentication, single sign-on, and identity management services described above.

Because the one-time password 102 represents sensitive information that may be used to impersonate a user, typically exchange of such a password would occur via only an authenticated communication session between two computing systems. However, creation of such an authenticated communication session between the identity service and a server platform 50 each time a one-time password is requested may introduce significant computational overhead at both the server platforms 50 and identity service 20. Accordingly, in aspects of the present disclosure, server platforms 50 are requested to register with the identity service 20 by generating a public-private key pair, and sending the public key of the key pair to the identity service 20. The server platform 50 can maintain the private key (denoted PrK) in a key data storage 72 of the server platform, while the public key (denoted PuK) can be maintained at the identity service in key data storage 42.

The public-private key pair may be used to secure one-time passwords requested by the server platform 50 when transmitted between the identity service 20 and server platform. In particular, an encrypted one-time password 104 may be transmitted via an unauthenticated channel via network 18, thereby ensuring security of the one-time password displayed use of an unauthenticated channel. The overhead required to encrypt the one-time password (e.g. with the public key of the public-private key pair) is generally lower than would be required to establish an authenticated communication channel between the identity service 20 and server platform 50, thereby making communication of such an encrypted one-time password 104 a comparatively efficient manner of distribution of such passwords. The server platform 50 may then deliver the one-time password 102 to the user device 12 in any manner so desired by the entity (text, email, etc.).

Figure 2:
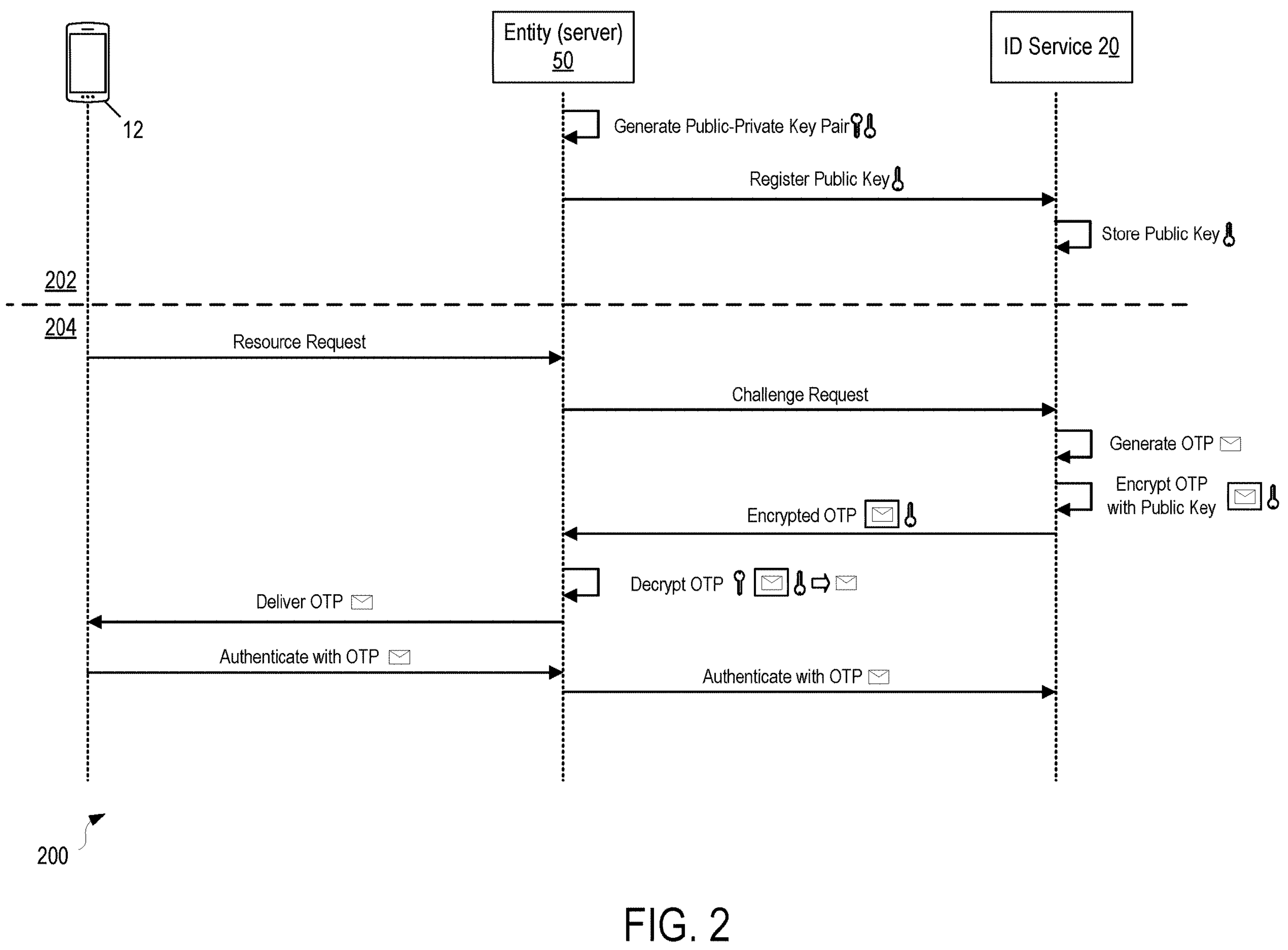
FIG. 2 is an example message flow diagram showing a process for secure one-time password delivery.

FIG. 2 is an example message flow diagram showing a process 200 for secure one-time password delivery. The process 200 is performed among a user device 12, the entity, as represented by a server platform 50, and an identity service 20. In the example shown, the process 200 includes a registration phase 202 and an identity authentication phase 204.

In the registration phase 202, the entity, for example via a server platform 50, will generate a public-private key pair. The entity will then send a public key of the public-private key pair to the identity service 20, which proceeds to store the public key. The entity will maintain the private key of the public-private key pair, such that any messages received from the identity service encrypted with the public key may only be correctly decrypted by the entity, and no other entity is capable of decrypting such messages.

In the identity authentication phase 204, a user request for access to a secure resource may be received from the user device 12. In response, the entity may perform one or more authentication actions at that entity itself. However, in some instances the entity may request identity authentication at the identity service 20 either in place of or in addition to any authentication actions performed by that entity itself. Accordingly, the entity will transmit a challenge to the identity service 20, which will in response generate a one-time password. Based on an identification of the entity, the identity service 20 will select a public key that was received from that entity or registered in association with that have a (e.g. stored in key data storage 42 as described above in conjunction with FIG. 1). The identity service 20 will use the public key to encrypt the generated one-time password, and send the encrypted one-time password to the entity, e.g. at server platform 50.

At the server platform 50, the entity will decrypt the one-time password using the private key of the public-private key pair associated with the encrypting public key. The decrypted one-time password may then be provided to the user device 12 from the server platform 50 by any mechanism desired (e.g., SMS, email, push message, and the like). Upon receipt of confirmation of the one-time password from the user device 12, and authentication message with the one-time password may be sent from the user device and received at the server platform 50. The authentication message may be forwarded by the server platform 50 to the identity service 20, for example at identity API 30, for confirmation of authentication of the user.

Figure 3:
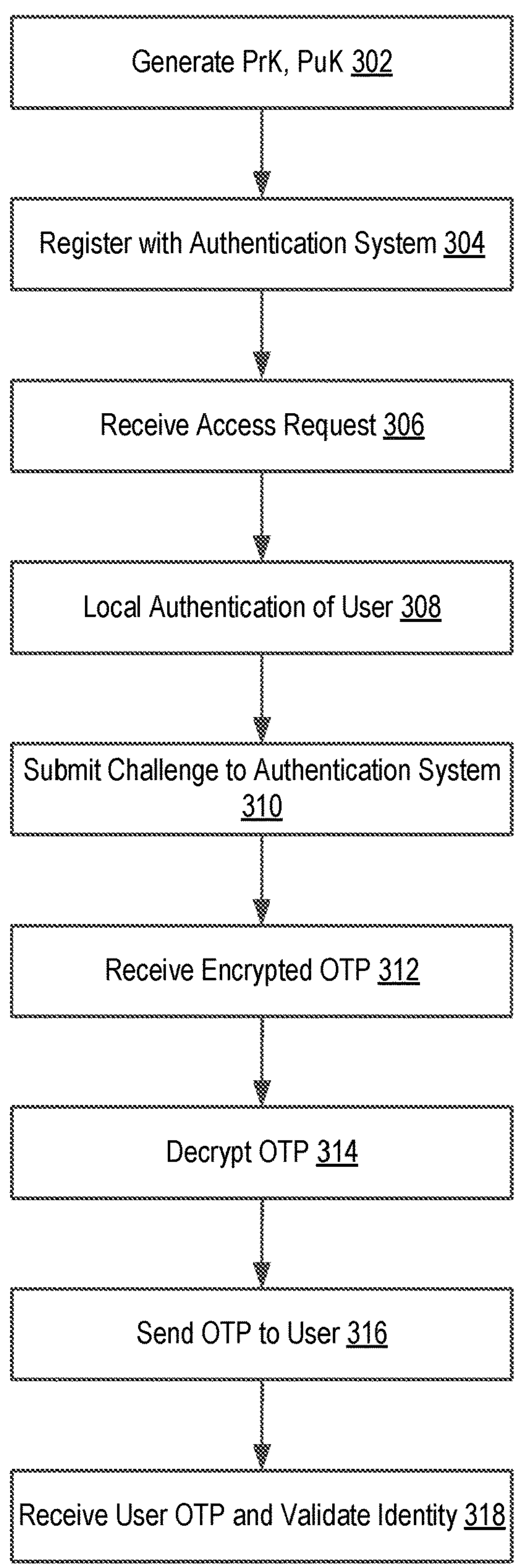
FIG. 3 is a flowchart of a method performed by an entity requesting secure one-time password delivery, according to an example embodiment.

FIG. 3 is a flowchart of a method 300 performed by an entity requesting secure one-time password delivery, according to an example embodiment. The method 300 can be performed, for example, at one or more server platforms 50 described above in conjunction with FIGS. 1-2.

In the example shown, the method 300 includes generating a public-private key pair (PrK, PuK) (at step 302). The entity can then register at an identity service 20 by sending the public key PuK of the public-private key pair to the identity service for storage (step 304). Generating the public-private key pair, and sending the public key may correspond, from the perspective of the entity, to the registration phase 202 of a process for secure one-time password delivery.

In the example shown, the method 300 includes receiving a remote access request (at step 306). This remote access request may be received from a user seeking access to a secure resource maintained by the entity, e.g., at server platform 50. The secure resource may be a secure application, secured account information, secure data, or other types of information for which user authentication via a third party authentication service, either in whole or in part, is desired. The request may be received from a user device 12 associated with the user, as noted above. Receipt of the request may initiate the identity authentication phase 204 of a process for secure one-time password delivery, from the perspective of the entity.

Optionally, the method 300 includes local authentication of the user from which the access request is received (step 308). This can include a standard username/password based authentication process performed by the user 10 at the server platform 50, or any other type of user authentication process. Such a process may be utilized in conjunction with use of the identity service 20 when multifactor authentication of a given user is desired. However, in some example applications, local authentication of the user may be excluded from the process.

In the example shown, the method 300 includes submitting a challenge, from the server platform 50, to the identity service 20 (step 310). In some examples, the challenge may correspond to a request for a one-time password from the identity service 20, and may be submitted to the identity service at an identity API 30 as discussed above. In some examples, the request may include an identification of the server entity, as well as the user to whom the one-time password is to be directed.

In the example shown, the method 300 further includes receiving an encrypted one-time password (step 312). The encrypted one-time password is received at the server platform 50 from the identity service 20 via an unauthenticated channel, such as the same channel on which the challenge was submitted. The encrypted one-time password may be received from the identity API 30 in response to the request.

Once the encrypted one-time password is received, the server platform 50 of the entity may decrypt the encrypted one-time password using a private key associated with the entity (step 314).

Once the one-time password is recovered in clear text form, the server platform 50 may send the one-time password to the user via any desired mechanism (step 316). That is, the entity may send to the user 10, for example via user device 12, the one-time password by push notification, SMS message, email, and the like. Accordingly, the entity may select a particular delivery provider and delivery channel for the one-time password. This provides greater flexibility to the entity as compared to relying on the identity service 20 to provide the one-time password to the user directly. In response to receipt of the one-time password, the user may confirm the one-time password, and send back a message including the one-time password or a validation message; that validation message may be forwarded to the identity service 20 by the server platform 50 for identity validation and authentication of the user 10 (step 318).

Figure 4:
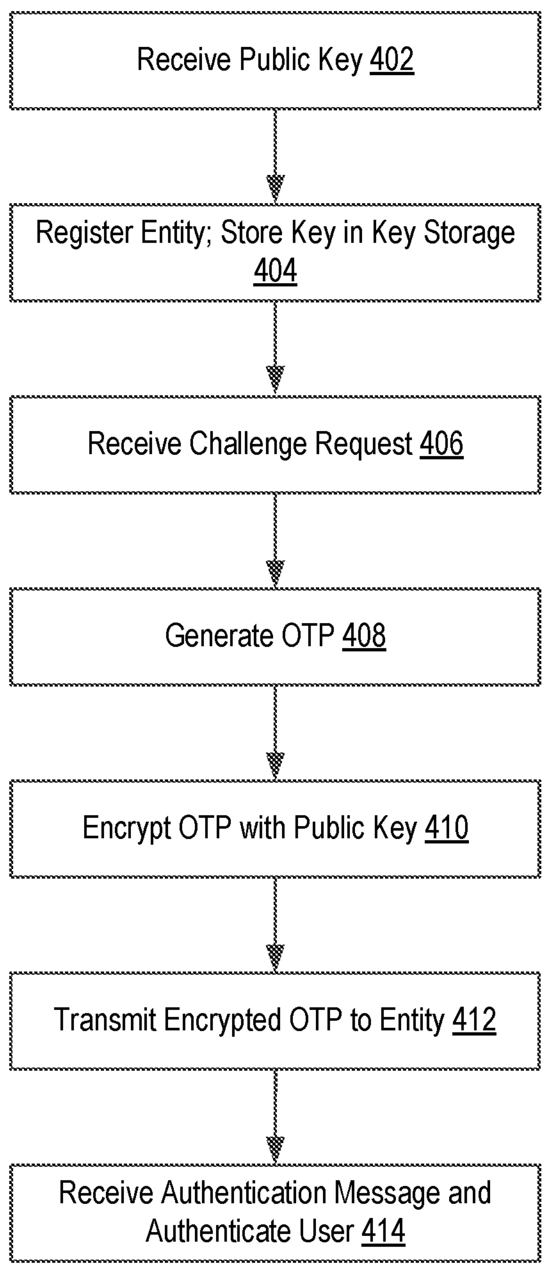
FIG. 4 is a flowchart of a method performed by an authentication service providing secure one-time password delivery, according to an example embodiment.

Referring now to FIG. 4, a flowchart of a method 400 performed by an authentication service providing secure one-time password delivery is shown, according to an example embodiment. The method 400 can be performed, for example, at an identity service 20 described above in conjunction with FIGS. 1-2.

In the example shown, the method 400 includes receipt of a public key of a public-private key pair from an entity, for example from a server platform 50. Receipt of the public key may initiate, from the perspective of the identity service 20, the registration phase 202 of a process for secure one-time password delivery. The public key may be generated by the entity, and provided to the identity service 20 for registration with the identity service to receive encrypted one-time passwords. Accordingly, the method can include registering the entity and storing the key in a key storage, for example key data storage 42 (step 404).

In the example shown, the method further includes receiving a challenge (step 406). The challenge may correspond to a request for a one-time password received at an identity API 30 of the identity service 20. Receipt of the challenge may correspond to initiation of the identity authentication phase 204 of a process for secure one-time password delivery, from the perspective of the identity service 20.

In the example shown, the method 400 includes generating a one-time password (step 408). The one-time password may correspond to an alphanumeric code randomly generated to be sent to the user for validation. The one-time password can be encrypted using the public key of the entity identified as the sender of the challenge of step 406 (step 410). The identity service 20 may then transmit the encrypted one-time password to that entity, for example to server platform 50, via an unauthenticated communication channel (step 412). Thereafter, the identity service 20 may receive, from the entity, and authentication message and may perform one or more additional authentication steps to authenticate a particular user who is seeking access to a secure resource at the entity, e.g. at server platform 50 (step 414).

In addition to the above, it is noted that a variety of other processes may be utilized by the server platforms 50 and/or the identity service to improve security of one-time passwords. In some examples, a server platform 50 will register a single public key at the identity service 20. However, in other examples, the server platform 50 may register more than one public key at the identity service. In such instances, the challenge sent from the entity will include identification of the public key to be used. Furthermore, in some instances, an expiration time may be assigned to the public-private key pair by either the server platform 50 or the identity service 20. Upon expiration, the server platform may discard the private key and regenerate a new public-private key pair, and register the new public key at the identity service. The expiration time may be set at the server platform 50, or may be sent at the identity service 20. If set at the identity service, in some examples, upon expiration, requests for one-time passwords will result in an error response to the server platform 50 requiring re-registration with a new public key.

Referring to FIGS. 1-4 generally, it is noted that the methods and systems described herein provide a number of advantages to entities using a third party for identity verification services and one-time password generation. For example, by avoiding the need to establish an authenticated channel to the identity service, a significant number of exchanged messages and overhead at both the server platform 50 and the identity service are avoided, thereby reducing the delay in delivery of any one-time passwords to the server platform 50, and allowing the identity service 20 to service more one-time password requests by avoiding computational overhead. Further, the processes described herein provide control to the entity controlling its own server applications, thereby allowing such an entity to deliver one-time passwords to its users in any manner it deems appropriate, and without requiring a third party such as the identity service 20 to send those passwords on its behalf.

Figure 5:
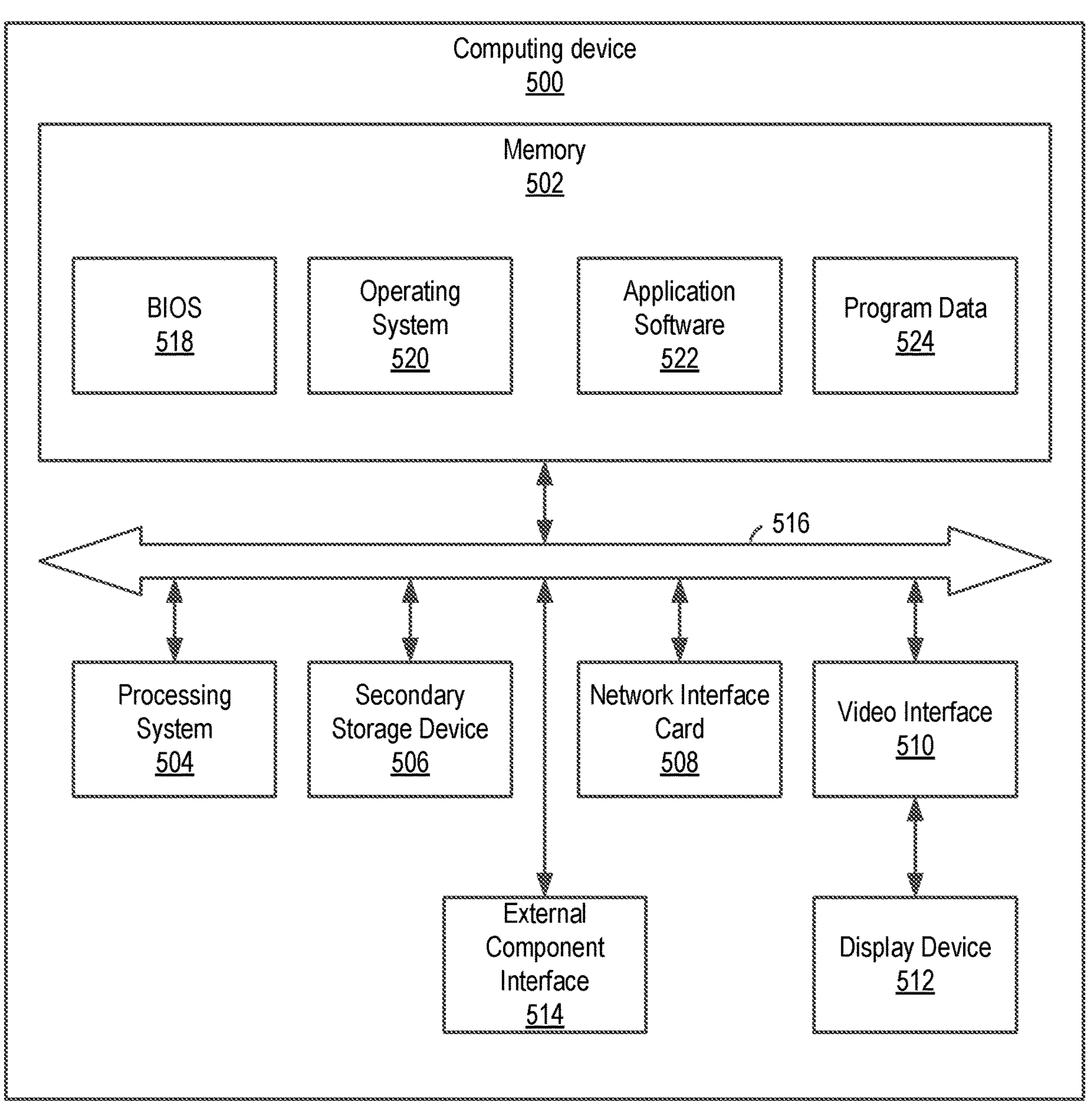
FIG. 5 illustrates an example computing system on which aspects of the present disclosure may be implemented.

FIG. 5 illustrates an example computing device 500 on which aspects of the present disclosure may be implemented. The computing device 500 can be used, for example, to implement computing devices such as the user device 12, the server platform 50 of the entity, or the identity service 20 seen above in FIG. 1.

In the example of FIG. 5, the computing device 500 includes a memory 502, a processing system 504, a secondary storage device 506, a network interface card 508, a video interface 510, a display unit 55, an external component interface 514, and a communication medium 516. The memory 502 includes one or more computer storage media capable of storing data and/or instructions. In different embodiments, the memory 502 is implemented in different ways. For example, the memory 502 can be implemented using various types of computer storage media, and generally includes at least some tangible media. In some embodiments, the memory 502 is implemented using entirely non-transitory media.

The processing system 504 includes one or more processing units, or programmable circuits. A processing unit, or processor, is a physical device or article of manufacture comprising one or more integrated circuits that selectively execute software instructions. In various embodiments, the processing system 504 is implemented in various ways. For example, the processing system 504 can be implemented as one or more physical or logical processing cores. In another example, the processing system 504 can include one or more separate microprocessors. In yet another example embodiment, the processing system 504 can include an application-specific integrated circuit (ASIC) that provides specific functionality. In yet another example, the processing system 504 provides specific functionality by using an ASIC and by executing computer-executable instructions.

The secondary storage device 506 includes one or more computer storage media. The secondary storage device 506 stores data and software instructions not directly accessible by the processing system 504. In other words, the processing system 504 performs an I/O operation to retrieve data and/or software instructions from the secondary storage device 506. In various embodiments, the secondary storage device 506 includes various types of computer storage media. For example, the secondary storage device 506 can include one or more magnetic disks, magnetic tape drives, optical discs, solid-state memory devices, and/or other types of tangible computer storage media.

The network interface card 508 enables the computing device 500 to send data to and receive data from a communication network. In different embodiments, the network interface card 508 is implemented in different ways. For example, the network interface card 508 can be implemented as an Ethernet interface, a fiber optic network interface, a wireless network interface (e.g., WiFi, WiMax, Bluetooth, etc.), or another type of network interface.

In optional embodiments where included in the computing device 500, the video interface 510 enables the computing device 500 to output video information to the display unit 55. The display unit 55 can be various types of devices for displaying video information, such as an LCD display panel, a plasma screen display panel, a touch-sensitive display panel, an LED or OLED screen, a cathode-ray tube display, or a projector. The video interface 510 can communicate with the display unit 55 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 514 enables the computing device 500 to communicate with external devices. For example, the external component interface 514 can be a USB interface and/or another type of interface that enables the computing device 500 to communicate with external devices or peripheral devices integrated within the same housing (e.g., in the case of mobile devices). In various embodiments, the external component interface 514 enables the computing device 500 to communicate with various external components, such as external storage devices, input devices, speakers, modems, media player docks, other computing devices, scanners, digital cameras, and fingerprint readers.

The communication medium 516 facilitates communication among the hardware components of the computing device 500. The communication medium 516 facilitates communication among the memory 502, the processing system 504, the secondary storage device 506, the network interface card 508, the video interface 510, and the external component interface 514. The communication medium 516 can be implemented in various ways. For example, the communication medium 516 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. The memory 502 stores a Basic Input/Output System (BIOS) 518 and an operating system 520. The BIOS 518 includes a set of computer-executable instructions that, when executed by the processing system 504, cause the computing device 500 to boot up. The operating system 520 includes a set of computer-executable instructions that, when executed by the processing system 504, cause the computing device 500 to provide an operating system that coordinates the activities and sharing of resources of the computing device 500. Furthermore, the memory 502 stores application software 522. The application software 522 includes computer-executable instructions, that when executed by the processing system 504, cause the computing device 500 to provide one or more applications. The memory 502 also stores program data 524. The program data 524 is data used by programs that execute on the computing device 500.

Although particular features are discussed herein as included within an electronic computing device 500, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include various types of dynamic random access memory (DRAM), solid state memory, read-only memory (ROM), electrically-erasable programmable ROM, magnetic disks (e.g., hard disks, floppy disks, etc.), and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 500 of FIG. 5, the computer-readable instructions are stored on devices that include non-transitory media. In particular embodiments, the computer-readable instructions are stored on entirely non-transitory media.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method comprising:

receiving, at an authentication service, a public key of a public-private key pair from an entity, the public-private key pair being specific to the entity and used in connection with one-time password generation for a plurality of different end users;

receiving, at the authentication service, a challenge request from the entity via an unauthenticated communication channel, wherein the challenge request is received from the entity in response to the entity receiving a resource request from a user device of an end user;

generating, at the authentication service, a one-time password to authenticate an identity of the end user;

encrypting, at the authentication service, the one-time password using the public key; and delivering the encrypted one-time password from the authentication service to the entity via the unauthenticated communication channel, wherein the entity is separate from the authentication service that generates the one-time password to authenticate the identity of the end user, and wherein the entity is separate from the user device of the end user.

2. The method of claim 1, further comprising receiving, from the entity, the one-time password after the one-time password is received by the entity from the user device of the end user.

3. The method of claim 2, further comprising validating an identity of the end user at the authentication service based on the one-time password received from the entity.

4. The method of claim 1, wherein the entity is a provider of a secure application and the authentication service is a third party identity verification service communicatively connected to the entity via the unauthenticated communication channel.

5. The method of claim 1, wherein the unauthenticated communication channel is established across a public network.

6. A method comprising:

transmitting, from an entity, a public key of a public-private key pair to an authentication service, the public-private key pair being specific to the entity and used in connection with one-time password generation for a plurality of different end users;

receiving, from a user device of an end user, a request for access to a secure resource requiring identity verification;

transmitting, from the entity, a challenge request to the authentication service via an unauthenticated communication channel;

receiving, at the entity, a one-time password encrypted with the public key from the authentication service via the unauthenticated communication channel;

decrypting, at the entity, the one-time password; and delivering the one-time password to the user device of the end user to authenticate an identity of the end user, wherein the entity is separate from the authentication service that generates the one-time password to authenticate the identity of the end user, and wherein the entity is separate from the user device of the end user.

7. The method of claim 6, further comprising:

receiving the one-time password from the user device of the end user at the entity; and in response to validating the one-time password with the authentication service, granting access to the secure resource to the user device of the end user.

8. The method of claim 6, wherein the secure resource comprises a secure application hosted by the entity.

9. The method of claim 6, wherein the authentication service is a third party identity verification service communicatively connected to the entity via the unauthenticated communication channel.

10. The method of claim 6, further comprising storing, at the entity, a private key of the public-private key pair.

11. The method of claim 6, further comprising generating, at the entity, the public-private key pair.

12. A system comprising:

an authentication system comprising a processor and a memory storing computer-executable instructions which, when executed by the processor, cause the authentication system to:

receive a public key of a public-private key pair from an entity, the public-private key pair being specific to the entity and used in connection with one-time password generation for a plurality of different end users;

receive a challenge request from the entity via an unauthenticated communication channel, wherein the challenge request is received from the entity in response to the entity receiving a resource request from a user device of an end user;

generate a one-time password to authenticate an identity of the end user;

encrypt the one-time password using the public key; and deliver the encrypted one-time password to the entity via the unauthenticated communication channel, wherein the entity is separate from the authentication system that generates the one-time password to authenticate the identity of the end user, and wherein the entity is separate from the user device of the end user.

13. The system of claim 12, further comprising a server system at the entity, the server system hosting a secure resource requiring identity verification for access, the server system including a processor and a memory storing computer-executable instructions which, when executed by the processor of the server system, cause the server system to:

transmit the public key of a public-private key pair to the authentication system;

receive, from the user device of the end user, a request for access to the secure resource;

transmit the challenge request to the authentication system via the unauthenticated communication channel;

receive the encrypted one-time password from the authentication system via the unauthenticated communication channel;

decrypt the encrypted one-time password to obtain the one-time password; and deliver the one-time password to the user device of the end user.

14. The system of claim 13, wherein the authentication system is communicatively connected to the server system at the entity via a public network.

15. The system of claim 13, wherein the authentication system is remotely located from the server system of the entity.

16. The system of claim 13, wherein the authentication system is further configured to validate an identity of the end user at the authentication system based on the one-time password received from the entity.

17. The system of claim 13, wherein the authentication system stores a plurality of public keys in a key storage, the plurality of public keys being received from a plurality of different entities.

* * * * *